US012639221B2

(12) United States Patent
Tune et al.

(10) Patent No.: US 12,639,221 B2
(45) Date of Patent: May 26, 2026

(54) OPTIMIZED TAG LOOKUP IN A WAY HALTING CACHE

(71) Applicant: Arm Limited, Cambridge (GB)

(72) Inventors: Andrew David Tune, Dronfield (GB); Edward Martin McCombs, Jr., Austin, TX (US); Sean James Salisbury, Dendron (GB)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 18/673,804

(22) Filed: May 24, 2024

(65) Prior Publication Data

US 2025/0363051 A1      Nov. 27, 2025

(51) Int. Cl.
*G06F 12/0802* (2016.01)

(52) U.S. Cl.
CPC ................................. *G06F 12/0802* (2013.01)

(58) Field of Classification Search
CPC ................................................... G06F 12/0802
See application file for complete search history.

(56) References Cited

U.S. PATENT DOCUMENTS

| | | | | | |
|---|---|---|---|---|---|
| 4,996,641 | A | * | 2/1991 | Talgam | G11C 29/24 |
| | | | | | 711/144 |
| 5,379,402 | A | * | 1/1995 | Fujihara | G06F 12/0835 |
| | | | | | 711/146 |
| 5,636,363 | A | * | 6/1997 | Bourekas | G06F 11/3656 |
| | | | | | 711/E12.063 |
| 6,334,173 | B1 | * | 12/2001 | Won | G06F 12/0802 |
| | | | | | 711/219 |

| | | | | | |
|---|---|---|---|---|---|
| 11,899,586 | B1 | * | 2/2024 | Thucanakkenpalayam Sundararajan | G06F 12/0895 |
| 2002/0188810 | A1 | * | 12/2002 | Nakamura | G06F 12/0802 |
| | | | | | 711/144 |
| 2005/0188249 | A1 | * | 8/2005 | Hart | G06F 11/1064 |
| | | | | | 711/144 |
| 2008/0022064 | A1 | * | 1/2008 | Kenkare | G11C 7/1039 |
| | | | | | 711/169 |
| 2015/0019840 | A1 | | 1/2015 | Anderson et al. | |
| 2015/0026413 | A1 | * | 1/2015 | Meier | G06F 12/0862 |
| | | | | | 711/137 |
| 2017/0116906 | A1 | | 4/2017 | Tai et al. | |

(Continued)

FOREIGN PATENT DOCUMENTS

CN          106126451 A      11/2016

OTHER PUBLICATIONS

A Microsoft dictionary showing a definition for register (Year: 2002).*

(Continued)

*Primary Examiner* — Janice M. Girouard
(74) *Attorney, Agent, or Firm* — Talem IP, Law, LLP

(57) ABSTRACT

A method of performing an address lookup process in a way halting cache includes receiving a tag portion and index bits of an address for a lookup; obtaining a first set of bits from the tag portion for a preamble, wherein a second set of bits from the tag portion form a prologue; performing a first matching operation using the preamble to identify a hit in a row of a memory of the way halting cache, the row being selected by the index bits; and for any identified hit from the first matching operation, performing a second matching operation using the prologue and the index bits to finalize the hit and checking a valid bit when performing the second matching operation.

18 Claims, 9 Drawing Sheets

(56) References Cited

U.S. PATENT DOCUMENTS

| | | |
|---|---|---|
| 2021/0201974 A1 | 7/2021 | Asadi et al. |
| 2022/0091992 A1 | 3/2022 | Shanbhogue et al. |
| 2022/0283948 A1 | 9/2022 | Chofleming et al. |
| 2022/0405209 A1 | 12/2022 | ChoFleming et al. |
| 2023/0195565 A1 | 6/2023 | Shankar et al. |

OTHER PUBLICATIONS

Daniel Moreau et al. "Practical Way Halting by Speculatively Accessing Halt Tags" 2016 Design, Automation & Test in Europe Conference & Exhibition (DATE), Mar. 14, 2016, 7 pages.

Faissal M. Sleiman et al. "Embedded Way Prediction for Last-Level Caches" 2012 IEEE 30th International Conference on Computer Design (ICCD), Sep. 3, 2012, 8 pages.

Chuanjun Zhang et al. "A Way-Halting Cache for Low-Energy High-Performance Systems" ACM Transactions on Architecture and Code Optimization, Mar. 2005, 21 pages, vol. 2, No. 1.

Chuanjun Zhang et al. "A Way-Halting Cache for Low-Energy High-Performance Systems" Proceedings of the 2004 International Symposium on Low Power Electronics and Design, Aug. 11, 2004, 4 pages.

International Search Report and Written Opinion issued in International Application No. PCT/GB2025/051140, mailed Jul. 25, 2025, 13 pages.

Kim, Moonsoo, et al., "Segmented Tag Cache: A Novel Cache Organization for Reducing Dynamic Read Energy," IEEE Transactions on Computers, Oct. 1, 2019 (accessible Mar. 29, 2019), pp. 1546-1552, vol. 68, issue 10.

* cited by examiner

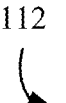
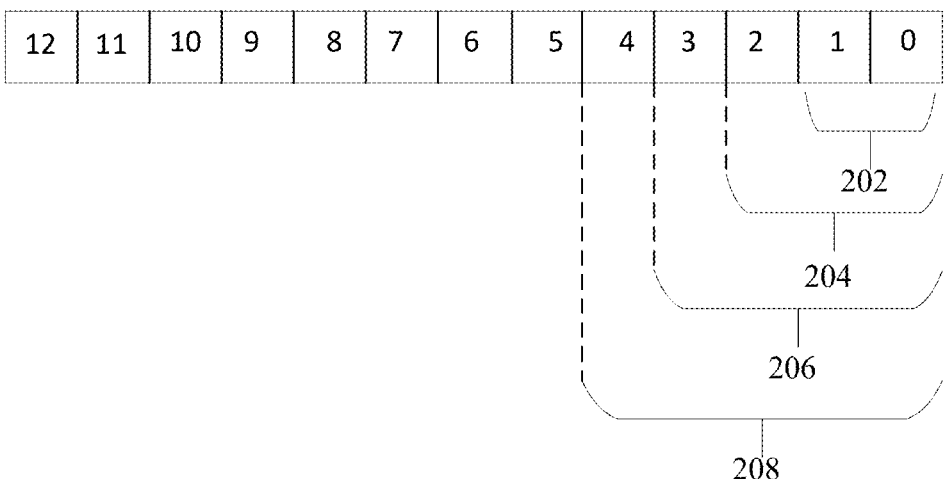
FIG. 2A
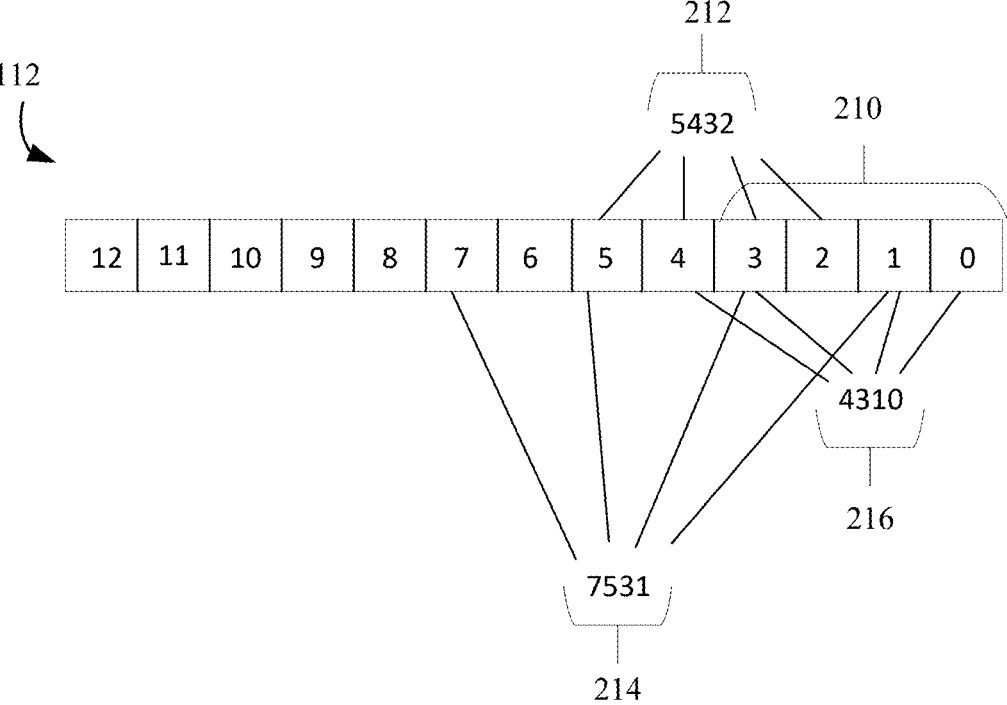
FIG. 2B

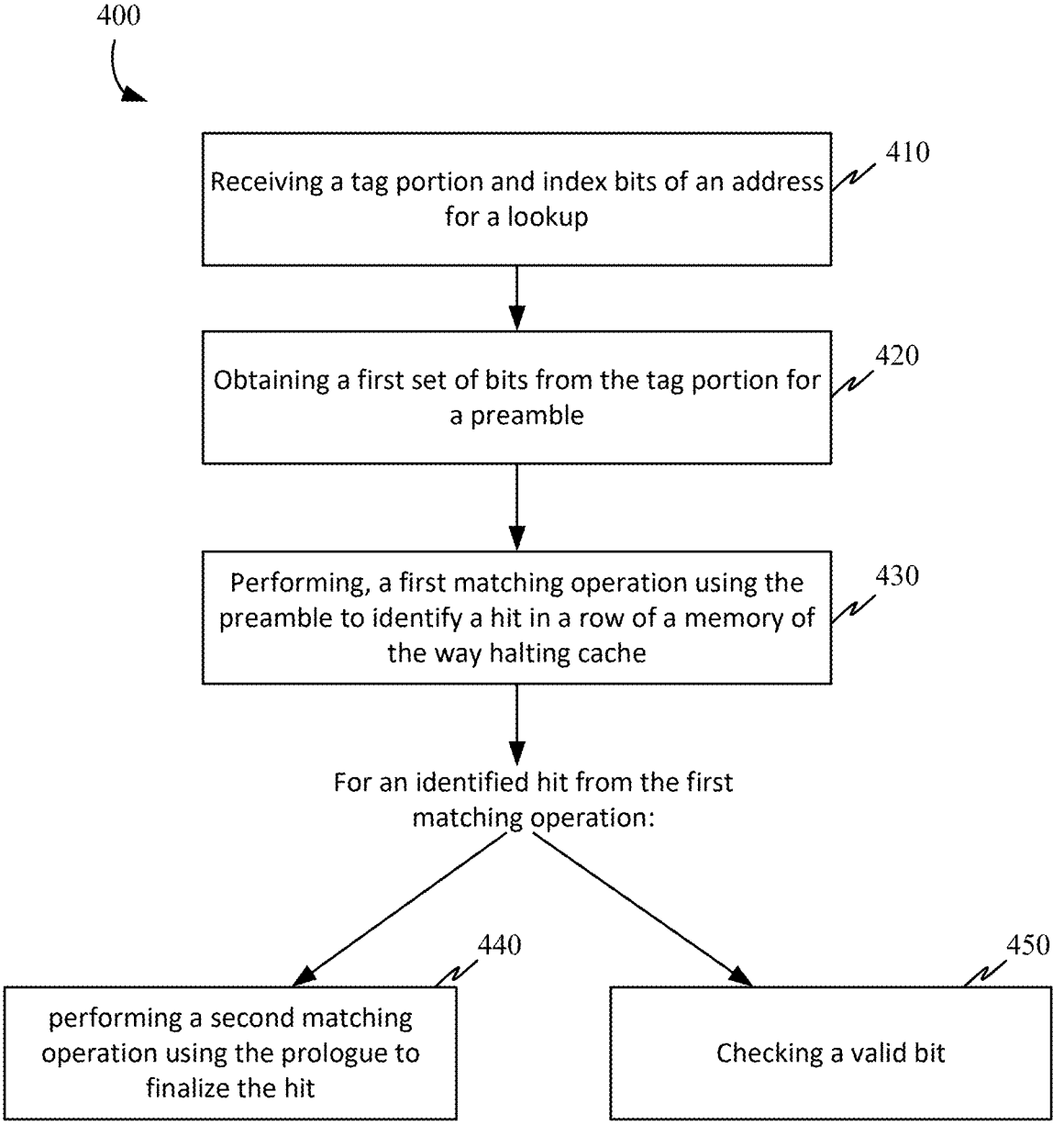

400

Receiving a tag portion and index bits of an address for a lookup — 410

Obtaining a first set of bits from the tag portion for a preamble — 420

Performing, a first matching operation using the preamble to identify a hit in a row of a memory of the way halting cache — 430

For an identified hit from the first matching operation:

performing a second matching operation using the prologue to finalize the hit — 440

Checking a valid bit — 450

FIG. 4

OPTIMIZED TAG LOOKUP IN A WAY HALTING CACHE

BACKGROUND

Cache memory and other memory subsystems can be located relatively close to a processor to provide fast access of frequently used data to the processor. Random Access Memory (RAM), and specifically Static Random Access Memory (SRAM), is typically the type of memory used for these memory subsystems. SRAM is generally configured as an array, or matrix of memory units that are individually addressable.

Memory can be set-associative and organized by index and way. A cacheline refers to the data corresponding to a memory address. A set refers to a limited number of places in the memory where a cacheline can reside (e.g., if associativity is equal to 1, the memory is considered to be "direct mapped"). Each associativity corresponds to a "way." For example, an associativity of 2 corresponds to two ways, an associativity of 4 corresponds to four ways, and an associativity of 16 corresponds to 16 ways. The index indicates which set a cacheline is stored or is to be stored into and is computed from the address. A tag refers to part of the address that is stored in the tag RAM and identifies, in conjunction with the index, the memory address that the cacheline corresponds with.

To find whether a memory address is in the cache memory or other memory subsystem, a lookup operation can be performed in the tag RAMs. As part of the lookup operation, a portion of an incoming address (e.g., the portion providing the tag function) is compared to the stored tags in the tag RAMs. A "hit" occurs when the incoming address (e.g., the portion providing the tag function) matches a stored tag in a way and the stored tag is considered valid (e.g., as per appropriate state bits(s)). In a typical n-way set-associative cache, data belonging to an address will be in 0 or 1 of n places. Based on the hit of the incoming tag portion with a tag in the tag RAM, the appropriate data RAM can be accessed. For a typical way-halting cache there is an attempt to reduce the number of bits of the tags that are accessed in each way. Thus, if there is any partial mismatch during the lookup (a "miss"), accesses to that way are halted, saving power by not accessing the full tag address lookup.

Accessing memory, such as RAM, utilizes large amounts of energy when multiple ways are accessed all at once using an incoming address to find a matching address that may be in one way of the memory. A process that can locate the desired tag while accessing a minimal number of ways has the potential to save a substantial amount of energy.

BRIEF SUMMARY

Optimized tag lookups in a way halting cache are described. As described herein, tag way halting can be performed as part of a two-phase access, where a tag lookup occurs in two parts where a first part of the tag lookup is used to filter accesses to ways containing bits of the tag for the second part of the tag lookup by inhibiting access to memory of the ways that mismatch. The first part of the tag lookup contains a first set of bits of the tag and can be referred to as "preamble bits" or "preamble". The second part of the tag lookup contains a second set of bits of the tag and can be referred to as "prologue bits" or "prologue." Through particular selection of the preamble bits, it is possible to obtain further power savings.

A method of performing an address lookup process in a way halting cache can include receiving a tag portion and index bits of an address for a lookup; obtaining a first set of bits from the tag portion for a preamble, wherein a second set of bits from the tag portion form a prologue; performing a first matching operation using the preamble to identify a hit in a row of a memory of the way halting cache, the row being selected by the index bits; and for any identified hit from the first matching operation, performing a second matching operation using the prologue and the index bits to finalize the hit and checking a valid bit when performing the second matching operation.

A system that can be used to perform the address lookup process in a way halting cache can include: a preamble tag memory including a preamble memory control circuit, a preamble memory array a preamble memory wordline driver, a preamble memory input/output circuitry, a preamble memory hit circuitry, and a preamble memory address bit selection circuitry, wherein the preamble memory hit circuitry is coupled to obtain a first set of bits from a tag portion of an address for a lookup in accordance with the preamble memory address bit selection circuitry; and a prologue tag memory including a prologue memory control circuit, a prologue memory array, a prologue memory wordline driver, a prologue memory input/output circuitry, a prologue memory hit circuitry, a valid bit check logic, and a prologue memory address bit selection circuitry, wherein the prologue memory hit circuitry is coupled to obtain a second set of bits from the tag portion of the address for the lookup in accordance with the prologue memory address bit selection circuitry and the valid bit check logic is coupled to receive a valid bit of a stored address.

A memory can include: a control circuit, a memory array; a wordline driver, an input/output circuitry, a hit circuitry, an error correction code (ECC) logic that outputs a partial ECC result, a valid bit check logic, wherein the valid bit check is coupled to receive a valid bit of a stored address, and an address bit selection circuitry, wherein the hit circuitry is coupled to receive a set of bits from an address for lookup in accordance with the memory address bit selection circuitry. The memory is suitable for a prologue memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2A illustrates a simplistic representation of a distribution of address bits into a preamble.

FIG. 2B illustrates a simplistic representation of a few examples of selection of bits for the preamble.

FIG. 4 illustrates a method of performing an address lookup process in a way halting cache.

DETAILED DESCRIPTION

Optimized tag lookups in a way halting cache are described. As described herein, tag way halting can be performed as part of a two-phase access, where a tag lookup occurs in two parts where a first part of the tag lookup (for the "preamble") is used to filter accesses to ways containing bits of the tag for a second part of the tag lookup (the "prologue") by inhibiting access to memory of the ways that mismatch. Through particular selection of the preamble bits, it is possible to obtain further power savings.

Current way halting techniques and configurations can suffer from high energy consumption and area overhead due to duplication of efforts across many ways (e.g., as part of additional circuitry and parallel operations) and can suffer delay penalties due to routing hit signals across a chip to different banks and memories.

In addition, the power consumption due to parallel accesses of multiple memories can be an issue. Current way halting techniques are frequency limiting by looking up the full tag in the same cycle. This creates a long cycletime and makes it unusable in modern designs.

Figure 1A:
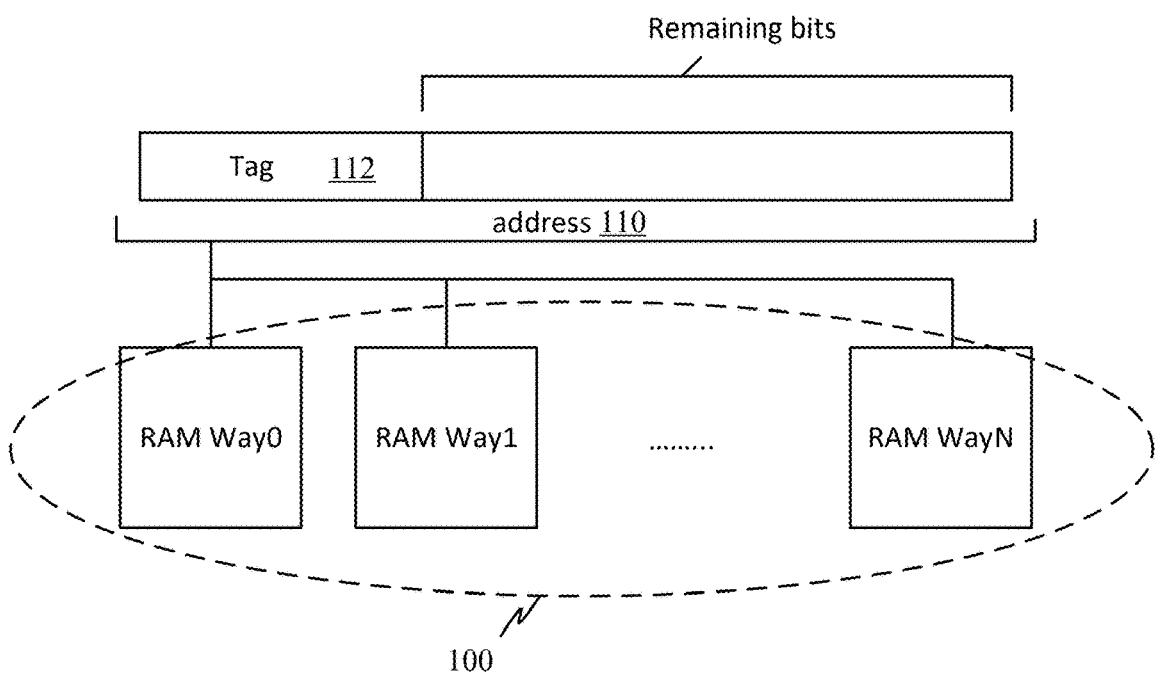
FIG. 1A shows a simplistic representation of a lookup operation for a memory access in an n-way cache.

FIG. 1A shows a simplistic representation of a lookup operation for a memory access in an n-way cache. Referring to FIG. 1A, during a lookup operation for a memory access in an n-way cache 100, an address 110 comes into the cache and goes out to all n ways (e.g., RAM Way0, RAM Way1, . . . , RAM WayN) of the n-way cache 100. Each RAM (e.g., RAM Way0, RAM Way1, . . . , RAM WayN) includes a memory array, a wordline driver, and input/output circuitry.

Accessing all n ways to compare tags (e.g., tag 112 of address 110) requires the precharging and access operations for the memories storing all n ways and therefore consumes a significant amount of power. In addition, bits read from and written to these tag memories are sent to and received from all across the chip when performing various conventional tag lookup approaches, which can contribute to delay penalties. To address these potential energy inefficiencies and latencies, a technique involving sequential accesses while combining certain operations for tag way halting is presented.

Figure 1B:
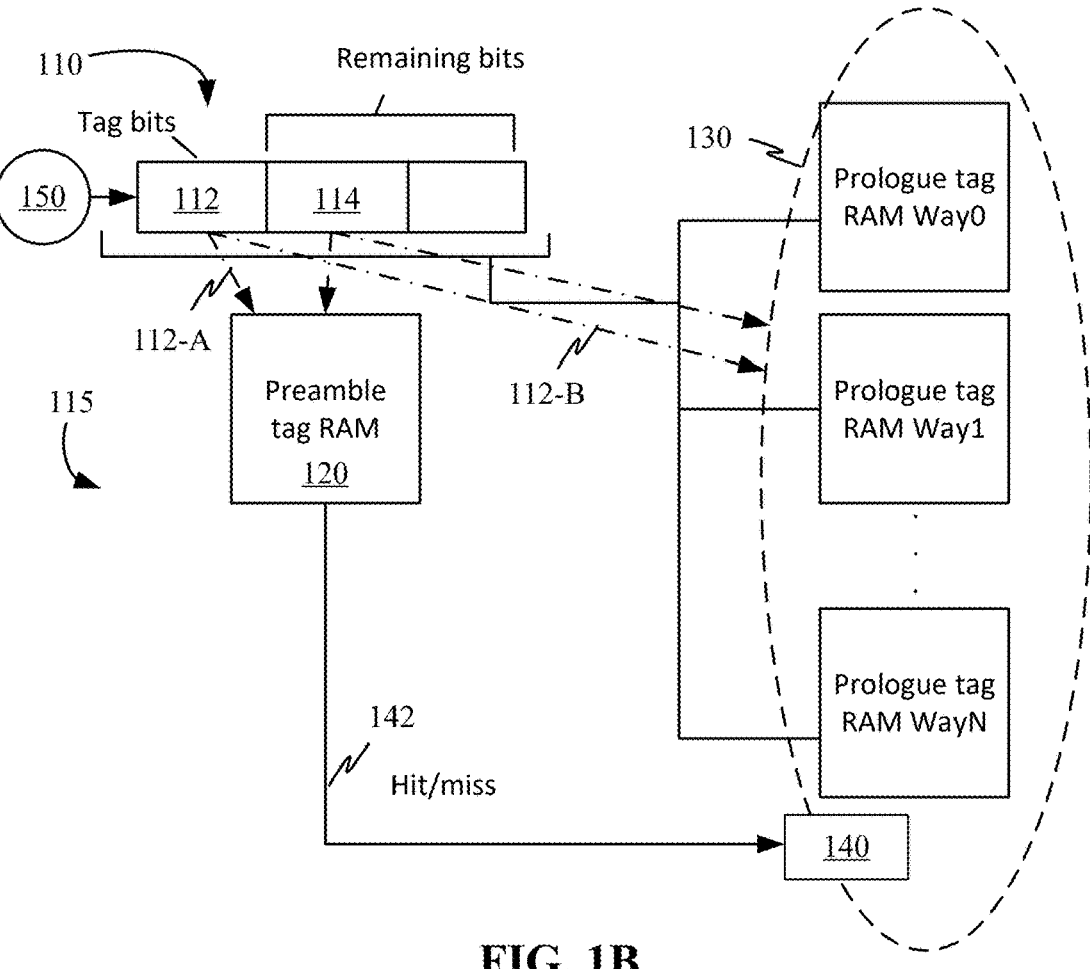
FIG. 1B shows a simplistic representation of a proposed two-phase access utilizing a memory architecture as described herein.

FIG. 1B shows a simplistic representation of a proposed two-phase access utilizing a memory architecture as described herein.

Referring to FIG. 1B, an n-way cache 115 of a proposed memory architecture can include a preamble tag memory (preamble tag RAM 120) and one or more prologue tag memories 130 (where n is an integer equal to or greater than 1).

Figure 6A:
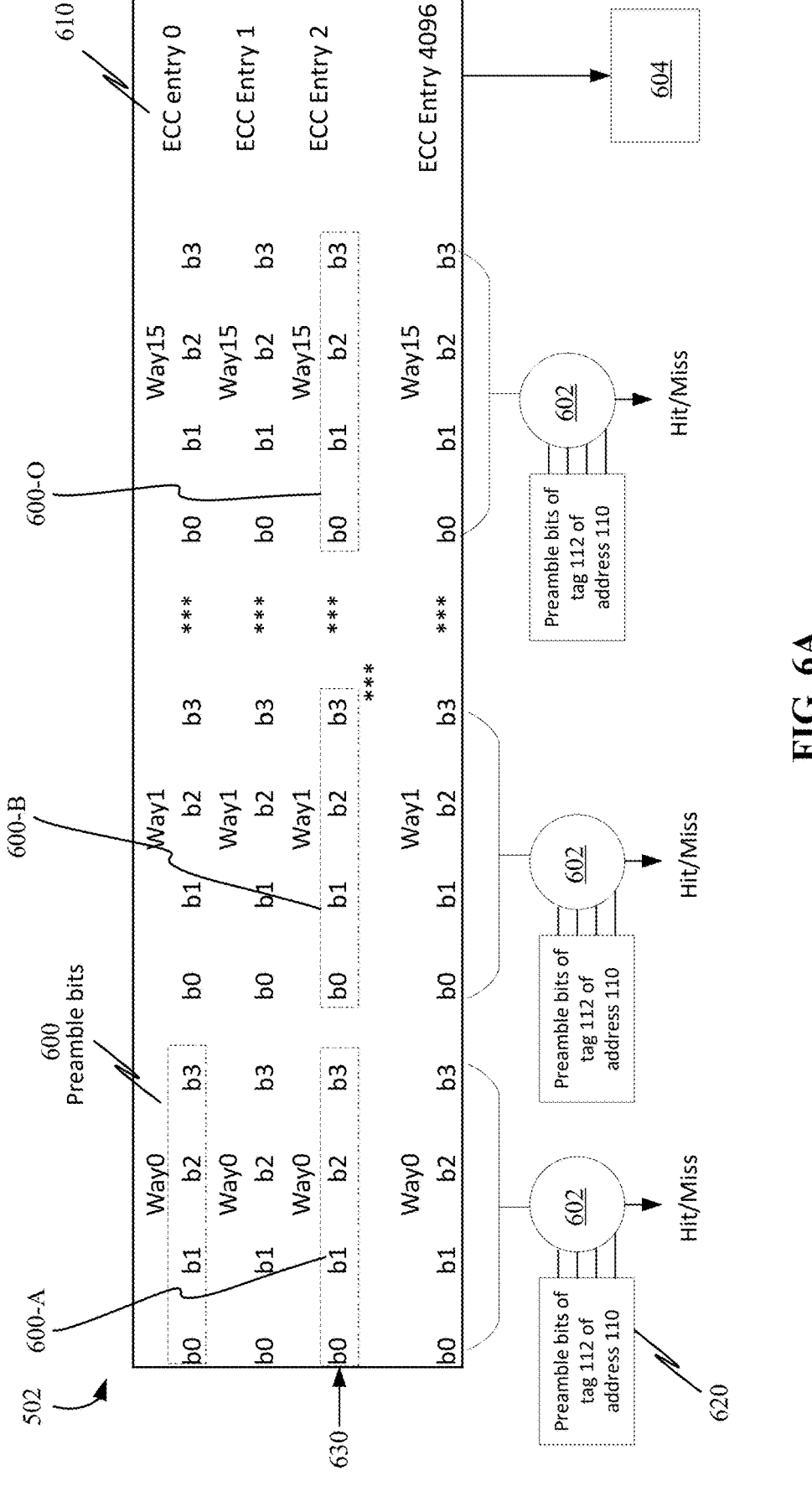
FIG. 6A illustrates an example of data that may be stored in a memory array of a way halting cache.

A preamble tag memory (e.g., preamble tag RAM 120) is an addressable memory (e.g., with an array of memory cells, a wordline driver, and input/output circuitry) that stores preamble bits of tags of a plurality of addresses. In addition to preamble bits, other bits may be stored in the preamble tag memory. For example, error correction code (ECC) bits can be stored in the preamble tag memory covering some or all data in a row. In some cases, a preamble tag memory can store certain state bits. An example implementation of data stored in a preamble tag memory is shown in FIG. 6A. In some cases, some other memory data information can be stored in the preamble tag memory.

Figure 6B:
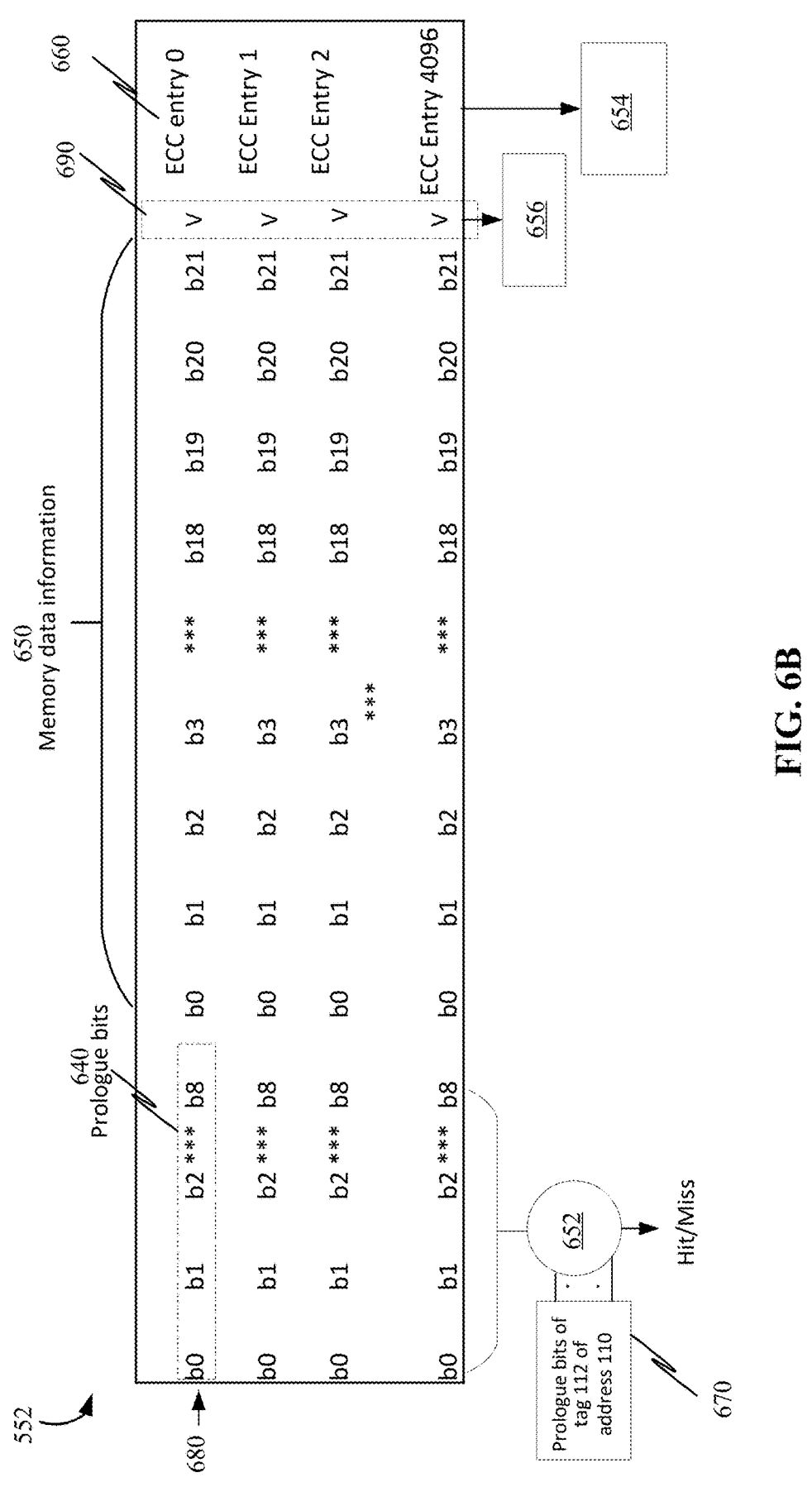
FIG. 6B illustrates another example of data that may be stored in a memory array of a way halting cache.

A prologue tag memory (e.g., prologue tag memory 130) is an addressable memory (e.g., with an array of memory cells, a wordline driver, and input/output circuitry) that stores prologue bits of tags of a plurality of addresses. In addition to prologue bits, other bits may be stored in the prologue tag memory. For example, ECC bits can be stored in the prologue tag memory covering some or all data in a row. In addition, the prologue tag memory can store all or some of the other bits of an address (e.g., including memory data information/cacheline). An example implementation of data stored in a prologue tag memory is shown in FIG. 6B.

A two-phase access is enabled by using the preamble tag RAM 120 to control access to the prologue tag memories 130 for the n ways.

Figure 5A:
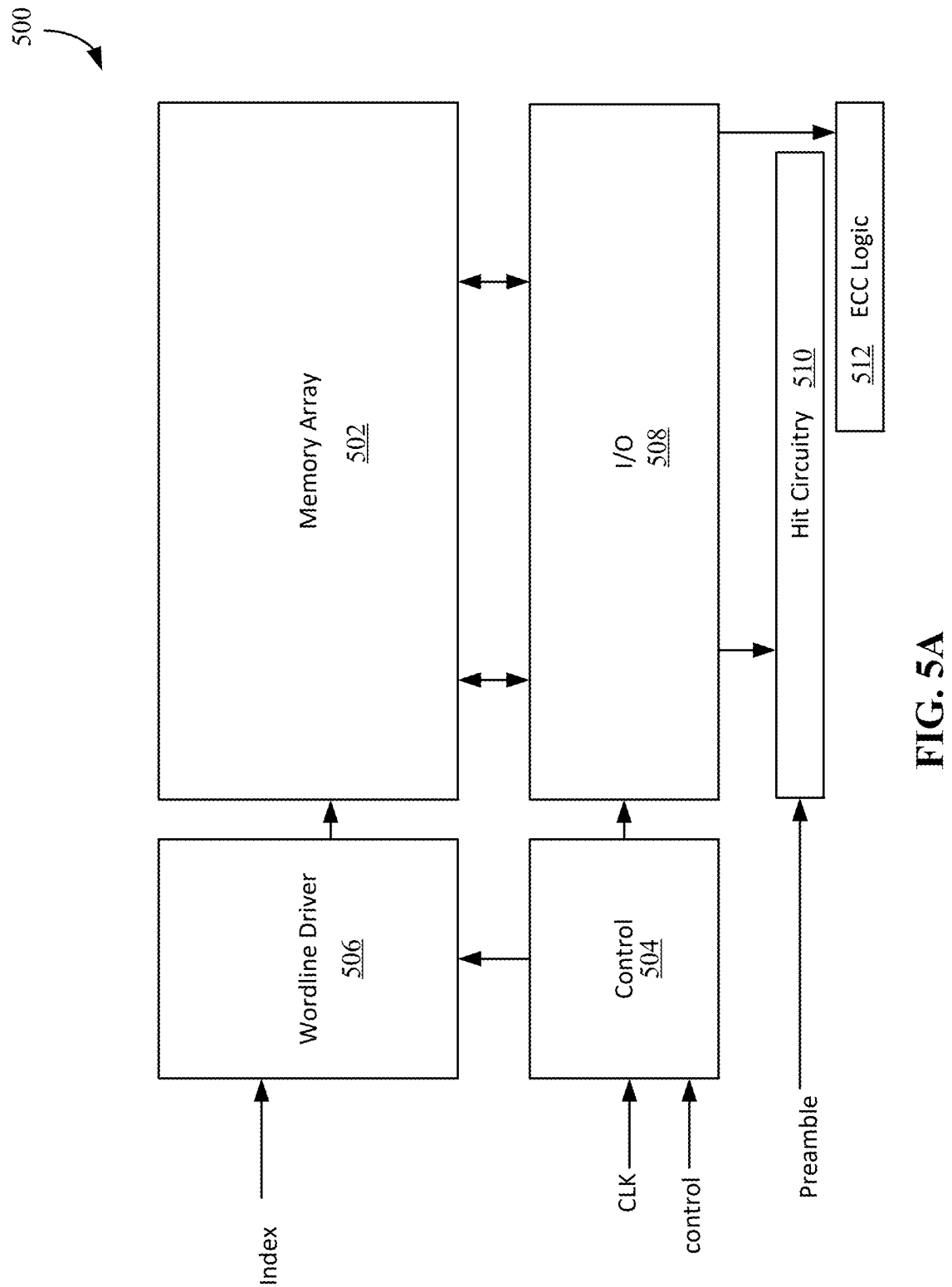
FIG. 5A illustrates a representational diagram of a memory circuitry that can be used in a first phase of tag way-halting.
Figure 5B:
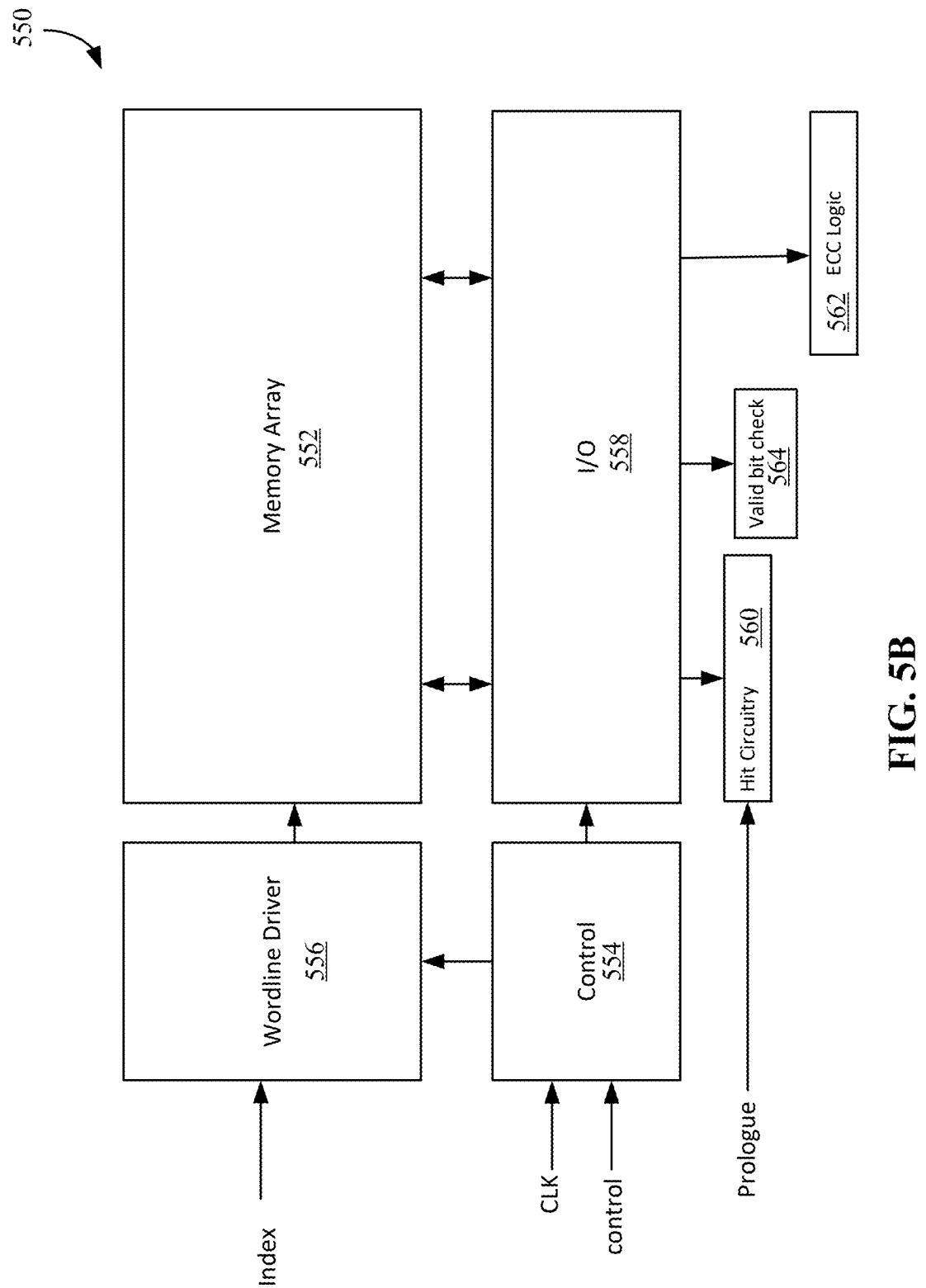
FIG. 5B illustrates a representational diagram of a memory circuitry that can be used in a second phase of tag way-halting.

First, a hit or miss of a first set of bits (e.g., preamble 112-A) of the tag portion 112 with respect to each way of a plurality of ways is determined at the preamble tag RAM 120 using the preamble 112-A and an index portion 114 of the address 110 for lookup. Then, for each hit of the first set of bits, a corresponding way with stored prologue bits of the tags and remaining memory data information of the addresses is accessed and a hit or miss of the prologue 112-B of the tag portion 112 with respect to that corresponding way is determined using the prologue 112-B and the index portion 114 of the address 110 for lookup (e.g., with appropriate prologue tag memory accessed as enabled by selection logic 140 coupled to the prologue tag memories 130 that enables access to each of the prologue tag memories 130 under control of a hit or miss signal(s) 142 output from the preamble tag RAM 120). An example implementation of a preamble tag RAM 120 is shown in FIG. 5A and an example implementation of a prologue tag RAM is shown in FIG. 5B.

In that manner, only the ways that correspond to the partial hit from the preamble tag RAM 120 are accessed in the prologue tag RAM and the prologue 112-B of the address 110 is used to determine a fully complete, combined hit or miss for the address 110.

It should be understood that while n RAMs are shown for n ways for illustrative purposes, more than one way may be combined in a same RAM. For example, two or more ways may be combined into one RAM. In addition, in some cases, more than one preamble tag RAM is provided in order to be able to store the preambles of all the ways.

As mentioned above, different bits of an address are stored across a preamble tag memory and a prologue tag memory. An address can include various information bits/memory data information. One of these information bits is a valid bit that is used to communicate whether the data in the tag portion is valid, e.g., meaningful. Typically, the valid bit is checked prior to a comparison of the tag portion to stored data forming the tag in each way. However, if an architecture is a mostly-valid architecture (e.g., where the data is consistently valid), then power may be wasted to always read the valid bit out for operation until there is a hit on at least some of the bits of the comparison. In other words, the valid bit has very low entropy. Thus, the proposed design distributes the valid bit to the prologue tag memory (see e.g., example implementation of data of prologue tag memory shown in FIG. 6B). A validation operation in which the valid bit is checked to determine if the tag portion is valid can be performed in the second phase of tag way-halting at the time when a hit or miss is performed using the prologue bits.

In some cases, a hash 150 can be performed on an incoming address (e.g., on the tag bits 112 of the address 110 and correspondingly performed on the tag portions stored in the tag memories at the time the addresses are stored in the tag memory) for increasing the entropy of the tag bits 112, improving the filtering efficiency of the two-phase process. In some cases, the hash 150 can be a configurable XOR hash function.

It is possible to further optimize the filtering efficiency and power savings of the two-phase access through selection of the particular bits used for the preamble tag RAM lookup.

Selection of the number of bits to be preamble bits can be based on optimizations for energy consumption and area as some examples. For example, when performing a two-phase tag access, the more bits selected for the preamble, the fewer matching results are likely to occur, which minimizes the number of ways that hit during the first phase thereby reducing the number of way accesses and comparisons in the second phase. However, power savings from the two-phase approach can regress when too many bits are selected for the preamble. Therefore, an optimal number of bits can be chosen to balance the power efficiency and likelihood for a second phase lookup being performed. For example, with a tag size of 13 bits, a selection of 3-7 bits for the preamble may provide for optimal results. For example, FIG. 2A illustrates a simplistic representation of a distribution of address bits into a preamble. The tag portion 112 of the address is illustrated. As examples, the preamble can be selected to include two bits 202 (e.g., 10), three bits 204 (e.g., 210), four bits 206 (e.g., 3210), five bits 208 (e.g., 43210), six bits, etc.

Further, the relationship between number of preamble bits and likelihood of a hit to the correct way (and fewer ways with a final result that does not indicate a hit) can be less corelated by using the intentional selection of bits of the tag that have the most entropy. Thus, when selecting fewer bits, it would be desirable to have bits with the most entropy so that each of the fewer bits provides improvement and fewer matches. In some cases, the LSBs (least significant bits) of a tag portion of an address are used for the preamble as these are the most likely bits to change in value. However, other bits in the tag may show more change and can be used instead.

FIG. 2B illustrates a simplistic representation of a few examples of selection of bits for the preamble. For example, given a 4-bit preamble, the selected bits can be the least significant bits 210 (e.g., bit positions 3210). However, the selected bits are not required to be the least significant bits and instead can be selected for other properties (e.g., providing optimized filtering capabilities). The 4-bit preamble can include contiguous or non-contiguous bits. For example, referring to FIG. 2B, the 4-bit preamble can be contiguous bits 212 such as positions 5432, fully non-contiguous bits 214 such as positions 7531, and a combination of contiguous and non-contiguous bits 216 such as positions 4310. To enable appropriate selection of bits of the tag and address (e.g., address 110), selection circuitry can be included.

In some cases, not only can specific bits be selected for the preamble and/or prologue, a hash function (e.g., hash 150) can be applied with respect to the address in various manners such that some implementations can utilize the hash before selection of which bits correspond to the preamble and which bits correspond to the prologue, some implementations can utilize the hash after selection of which bits correspond to the preamble and which bits correspond to the prologue, and some implementations can utilize the hash function differently for the preamble and the prologue. For example, the preamble can be formed by hashing up to all of the address bits and a set of bits selected from the original address bits can be used for the prologue. As an illustration, given a 13 bit tag, all 13 bits may be used in a hash function such as an XOR-based hash function, to generate a 4-bit (or other sized preamble). The prologue can contain 9 bits so that the total number of bits stored for the tag between the preamble RAM and the prologue RAM remains at 13 bits. The 9 bits of the prologue can be selected from the original address. It is possible to discard any 4 bits that were used in the hash function for the preamble in order to generate the 9 bits of the prologue.

Figure 3A:
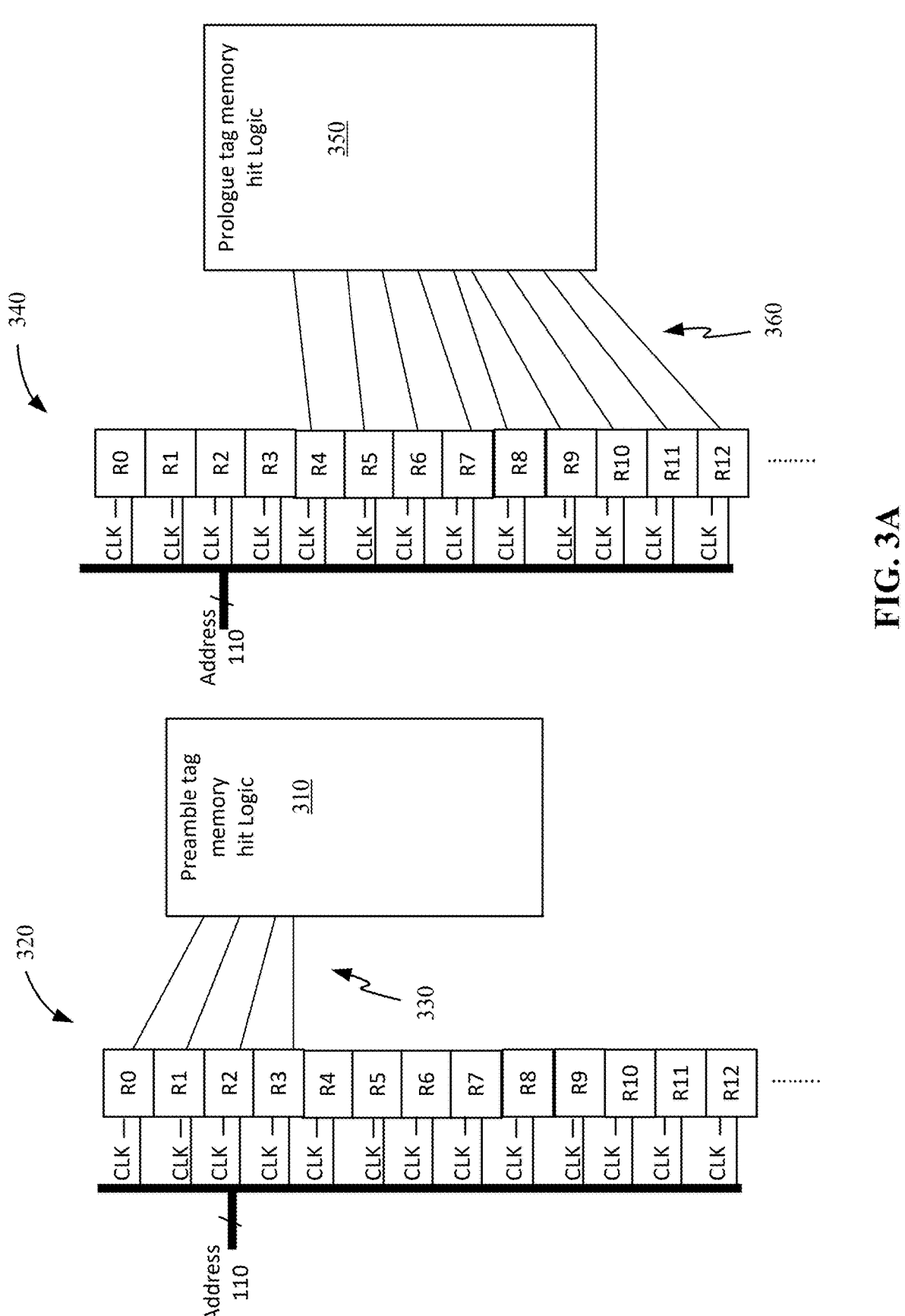
FIGS. 3A and 3B illustrate example implementations of selection circuitry for obtaining preamble bits and prologue bits.
Figure 3B:
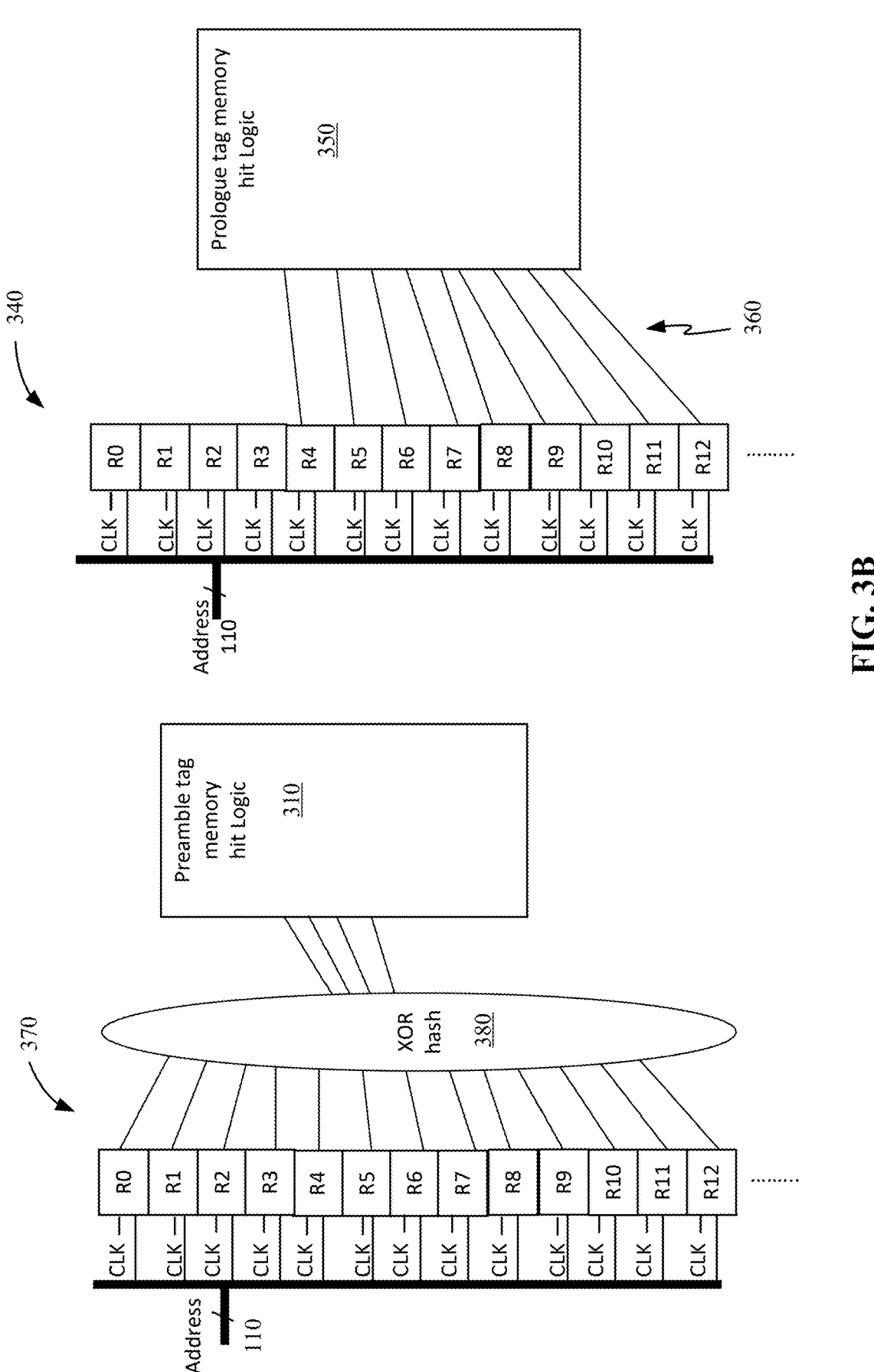

FIGS. 3A and 3B illustrate example implementations of selection circuitry for obtaining preamble bits and prologue bits. As reflected by the example implementations of selection circuitry, the preamble bits and the prologue bits of the tag are functions of the address, where the function may be simple such as bit select or more complex such as a hash. Thus, the preamble and the prologue can be sets of bits from the tag portion and obtained from the address via appropriate function.

Referring to FIG. 3A, hit circuitry 310 for the preamble tag RAM (e.g., preamble tag RAM 120 of FIG. 1B) can obtain preamble bits from an address 110 through selection circuitry 320, which includes a set of registers with selective output 330 (e.g., bit select function) coupled to the hit circuitry 310. Similarly, hit circuitry 340 for the prologue tag memory (e.g., prologue tag RAMs 130 of FIG. 1B) can obtain prologue bits from the address 110 through selection circuitry 340, which also includes a set of registers with selective output 360 (e.g., bit select function) coupled to the hit circuitry 350. The bits used for the preamble at the hit circuitry 310 and the bits used for the prologue at the hit circuitry 350 can be hard wired (e.g., during IC design), configurable (e.g., during manufacturing, for example, by fuse or laser etch), or reconfigurable (e.g., by end user, for example, by pass gates or other switches that are programmatically controlled as open or closed), depending on the implementation. In some cases, the hit circuitry 310 for the preamble tag RAM can be incorporated in the preamble tag RAM such as described with respect to hit circuitry 510 of FIG. 5A. In some cases, the hit circuitry 350 for the prologue tag RAM can be incorporated in each prologue tag RAM such as described with respect to hit circuitry 560 of FIG. 5B.

Referring to FIG. 3B, in another implementation of selection circuitry, hit circuitry 310 for the preamble tag RAM (e.g., preamble tag RAM 120 of FIG. 1B) can obtain preamble bits from an address 110 through selection circuitry 370, which includes a hash function (e.g., XOR hash 380) coupled to a set of registers storing some or all of the bits of the address 110. In the illustrative example, registers are coupled to the XOR hash 380 so that up to all the tag bits of the address 110 can be input to the XOR-based hash circuitry and used to generate the preamble. Here, the output of the XOR has 4 bits. As shown in FIG. 3B, hit circuitry 340 for the prologue tag memory (e.g., prologue tag RAMs 130 of FIG. 1B) can obtain prologue bits from the address 110 through selection circuitry 340 as described with respect to FIG. 3A. Thus, it is possible to have, in a single implementation, the preamble obtained based on a hash function and a prologue obtained based on a bit select function.

FIG. 4 illustrates a method of performing an address lookup process in a way-halting cache. Referring to FIG. 4 method 400 includes receiving (410) a tag portion and index bits of an address for a lookup; obtaining (420) a first set of bits from the tag portion for a preamble, wherein a second set of bits from the tag portion form a prologue; performing (430), a first matching operation using the preamble to identify a hit in a row of a memory of the way halting cache; and for an identified hit from the first matching operation, performing (440) a second matching operation using the prologue to finalize the hit and checking (450) a valid bit.

Obtaining (420) a first set of bits from the tag portion for a preamble can include selecting appropriate bits of the tag portion such as described with respect to FIGS. 2A, 2B, 3A, and 3B.

In some cases, the performing (430) a first matching operation using the preamble can thus be made by a comparison (e.g., using hit logic) of the preamble with the first set of bits for each way stored in a row in the memory. The identified hit from the first matching operation is a partial hit of the address for the lookup. The second matching operation is performed to finalize the hit.

In some cases, performing (440) the second matching operation using the prologue can also be made by a comparison (e.g., using hit logic) of the prologue with a corresponding number of tag bits stored in a row in the memory.

Checking (450) the valid bit of the address for the lookup can be performed when performing the second matching operation. In this manner, fewer bits can be used for the preamble while still retaining efficiencies.

Method 400 can be performed in a system that includes a preamble tag memory that performs (430) the first matching operation and a prologue tag memory that performs (440) the second matching operation and checks (450) the valid bit.

Such a preamble tag memory can include a preamble memory control circuit, a preamble memory array, a preamble memory wordline driver, a preamble memory input/output circuitry, a preamble memory hit circuitry, and a preamble memory address bit selection circuitry, wherein the preamble memory hit circuitry is coupled to obtain the first set of bits from the tag portion in accordance with the preamble memory address bit selection circuitry.

Such a prologue tag memory can include a prologue memory control circuit, a prologue memory array, a prologue memory wordline driver, a prologue memory input/output circuitry, a prologue memory hit circuitry, a valid bit check logic, and a prologue memory address bit selection circuitry, wherein the prologue memory hit circuitry is coupled to obtain a second set of bits from the tag portion of the address for the lookup in accordance with the prologue memory address bit selection circuitry and the valid bit check logic is coupled to receive a valid bit of a stored address. Example implementations of such a preamble tag memory and prologue tag memory are shown in FIGS. 5A and 5B (with additional example structures for selection circuitry shown in FIGS. 3A and 3B).

FIG. 5A illustrates a representational diagram of a memory circuitry that can be used in a first phase of tag way-halting as described herein. Referring to FIG. 5A, memory circuitry 500 includes a memory array 502, a control circuit 504, wordline driver 506, and input/output circuitry 508. Memory circuitry 500 can further include hit circuitry 510 and part of an error correction code circuitry (ECC logic 512). Although not shown, memory circuitry 500 can include selection circuitry such as described with respect to FIGS. 3A and 3B.

The memory array 502 is structured in an array of bitcells with rows accessed by wordlines and columns accessed by bitlines. Each bitcell refers to the memory element storing a single bit of information. In certain implementations, memory array 502 is static random-access memory (SRAM). The control circuit 504 provides control signals for operations of the memory circuitry 500. The wordline driver

506 receives an address and turns on a wordline indicated by the address in response to receiving a signal from the control circuit 504. The input/output circuitry 508 contains the read circuitry and write circuitry that utilize bitlines to read and write data out of and into the memory array 502.

The hit circuitry 510 supports the determination of a hit/miss of the tag bits within the memory circuitry 500. In particular, the hit circuitry 510 of the preamble tag memory performs a comparison of the preamble of a received address 110 and the stored set of bits of the tag portion in the preamble tag memory that is read out from the index. The ECC logic 512 supports certain parts of error correction processes within the memory circuitry 500.

Accordingly, in the architecture of the n-way cache 115 described with respect to FIG. 1B, memory array 502 stores a set of tag bits of each of a plurality of the ways (e.g., the preamble portion). In some cases, the set of tag bits of all of the n ways are able to be stored in the memory array 502. In cases where the set of tag bits of all of the n ways are not able to be stored in the memory array 502 (e.g., due to there being more bits than available space), additional memory circuitry 500 (e.g., additional preamble tag RAMs 120) can be provided for the preamble portions. FIG. 6A illustrates example data that may be stored in a memory array 502 implementing the preamble tag RAM 120.

The first set of bits (e.g., the preamble 112-A) from the tag portion 112 of an arriving address 110 is used by the hit circuitry 510 for determining a hit or miss of the first set of bits with respect to each way of the plurality of the ways covered by memory circuitry 500. Index bits 114 of the arriving address 110 are used to select the appropriate wordline by wordline driver 506. As mentioned above with respect to FIGS. 3A and 3B, the preamble memory hit circuitry (e.g., preamble tag RAM hit logic 310) can be coupled to receive the first set of bits of the tag portion of an address for a lookup in accordance with a preamble memory address bit selection circuitry (e.g., selection circuitry 320 or selection circuitry 370).

The ECC logic 512 uses the ECC bits stored in the memory array 502 to carry out a partial operation of ECC operations (e.g., at least a portion of a detection operation). ECC bits are used to determine the integrity of the data (e.g., whether a value has flipped such as due to radiation, etc.) and can be used to perform error correction. In the preamble tag RAM 120, the ECC bits stored in the memory array 502 cover the preamble bits of all the ways that are stored in a row of the memory array 502.

Advantageously, by incorporating the hit circuitry 510 in memory circuitry 500, determining a hit or miss of the first set of bits with respect to each way of a plurality of ways can be performed in a same stage as a read operation of the memory circuitry 500. By incorporating ECC logic 512 in memory circuitry 500, a partial error correction code operation can also be performed in the same stage as a read operation of the memory circuitry 500.

FIG. 5B illustrates a representational diagram of a memory circuitry that can be used in a second phase of tag way-halting as described herein. Referring to FIG. 5B, memory circuitry 550 includes a memory array 552, a control circuit 554, wordline driver 556, and input/output circuitry 558, hit circuitry 560, and part of an error correction code circuitry (ECC logic 562). Memory circuitry 550 can further include valid bit check logic 564. Although not shown, memory circuitry 505 can include selection circuitry such as described with respect to FIGS. 3A and 3B. Memory array 552, control circuit 554, wordline driver 556, and input/output circuitry 558 can be implemented such as described with respect to memory array 502, control circuit 504, wordline driver 506, and input/output circuitry 508 as described with respect to FIG. 5A.

In addition, similar to that described with respect to hit circuitry 510 of FIG. 5A, the hit circuitry 560 supports the determination of a hit/miss of the tag bits for a way within the memory circuitry 550. In particular, the hit circuitry 560 of the one or more prologue tag memories performs a comparison of the prologue of the received address 110 and the stored prologue bits of the tag portions stored in that prologue tag memory. In some cases, the hit circuitry 560 includes comparators that are coupled to receive the prologue bits of an arriving address and the prologue bits of each way stored in a row of the memory array 552 (e.g., by being coupled to sense amplifiers of the columns of the memory array).

The ECC logic 562 supports certain parts of error correction processes within the memory circuitry 550.

The valid bit check logic 564 is coupled to receive a valid bit of a stored address.

As mentioned above, for each partial hit of the preamble determined in the first phase, a prologue tag RAM storing a corresponding way is accessed, and determination of a hit or miss is performed using the prologue bits of the address. Therefore, in the architecture of the n-way cache 115 described with respect to FIG. 1B, memory array 552 stores the prologue portion of a tag and other memory data information in the prologue tag RAM corresponding to that way. In addition, memory array 552 stores valid bits for the addresses. FIG. 6B illustrates example data that may be stored in a memory array 552 of a memory storing prologue bits, e.g., of a prologue tag memory 130. Here, the second set of bits (e.g., the prologue bits 112-B) from the tag portion 112 of the arriving address 110 are used by the hit circuitry 560 to determine a hit or miss of the prologue bits. In this way, the prologue bits are only accessed in the second phase when there is a partial hit on the preamble bits. In addition, the valid bits are only checked after there is a partial hit on the preamble bits.

Although not shown, other logic may be carried out on some of the other memory data information in the prologue tag RAM. In addition, for a hit in the prologue tag RAM, the other memory data information in the prologue tag RAM can be read out and used in subsequent phases (e.g., to access the data at the address indicated by the memory data information and/or provide the data).

Similar to that described with respect to FIG. 5A, address bits ("index portion") from set portion 114 are used to select the appropriate wordline by wordline driver 556. In addition, as mentioned above with respect to FIGS. 3A and 3B, the prologue memory hit circuitry (e.g., prologue tag RAM hit logic 350) can be coupled to receive a set of bits of the tag portion of an address for a lookup in accordance with a prologue memory address bit selection circuitry (e.g., selection circuitry 340).

The ECC logic 562 uses the ECC bits stored in the memory array 552 to carry out a partial operation of ECC operations (e.g., at least a portion of a detection operation). The ECC bits stored in the memory array 552 can correspond to the bits of the address in a row for one way stored in the prologue tag RAM, for the bits of the address of more than one way if more than one way is stored in a row, and/or for an entire row. Accordingly, a prologue tag memory can include a control circuit, a memory array, a wordline driver, an input/output circuitry, a hit circuitry, ECC logic that outputs a partial ECC result, a valid bit check logic, wherein the valid bit check is coupled to receive a valid bit of a stored address, an address bit selection circuitry, wherein the hit circuitry is coupled to receive a set of bits from an address for lookup in accordance with the memory address bit selection circuitry. In certain implementations, the memory array stores fewer than all tag bits of each address stored therein, wherein the set of bits of the address for lookup selected by the memory address bit selection circuitry corresponds to tag bit positions of the fewer than all tag bits of each stored address.

Advantageously, by incorporating the hit circuitry 560 in memory circuitry 550, determining a hit or miss of the prologue bits from the tag portion of the address at a particular way can be performed in a subsequent cycle to the first phase and this subsequent phase can be part of a read operation of the memory circuitry 550. By incorporating ECC logic 562 in memory circuitry 550, a partial error correction code operation can also be performed in the subsequent cycle to the first phase. Furthermore, by storing the valid bit in memory circuitry 550 and including a valid bit check logic 564, it is possible to use fewer bits for the preamble while still retaining efficiencies.

FIG. 6A illustrates an example of data that may be stored in a memory array of a way halting cache as described herein. Referring to FIG. 6A, data within memory array 502 can include the preamble bits 600 from a plurality of ways (and may include the preamble bits from all available ways). In the example, preamble bits of a 16-way cache are shown. Here, four bits of the tag (b0, b1, b2, b3) are stored as the preamble for each way (Way0, Way1, . . . , Way 15) in a row of the memory array 502. In addition, ECC bits 610 are stored, covering the preambles of all sixteen ways. In such a case, 6 ECC bits may be used as an example.

Accordingly, with reference to both FIG. 6A and FIG. 5A, hit circuitry 510 can compare (602) all the preamble bits in the row to the preamble bits 620 from the address 110. For example, for row 630, preamble bits 600-A of Way0, preamble bits 600-B of Way1, all the way to preamble bits 600-O of Way 15 are each compared (602) to preamble bits 620 (e.g., of tag 112 of address 110). In addition, the ECC logic 512 can be used to perform a first partial error correction code operation (604) utilizing the ECC bits 610 for that row.

FIG. 6B illustrates another example of data that may be stored in a memory array of a way halting cache as described herein. Referring to FIG. 6B, data within memory array 552 can include the prologue bits 640, memory data information 650 including the valid bit 690, and ECC bits 660 for each row (whether one or more ways are in the RAM) or per way in a row. In the example, 9 prologue bits (where a tag is 13-bits and a preamble tag RAM stores 4-bit preambles), 22 bits of the remaining address information, and corresponding ECC bits are stored in each entry. Six ECC bits may be used as an example.

Accordingly, with reference to both FIG. 6B and FIG. 5B, hit circuitry 560 can compare (652) the prologue bits 640 of an entry (e.g., a row 680) to the prologue bits 670 from the address 110. The valid bit 690 for the entry is checked (656) using valid bit check logic 564. In addition, the ECC logic 562 can be used to perform a first partial error correction code operation (654) utilizing the ECC bits 660 for that entry (e.g., covering the prologue bits and remaining address information).

It should be understood that for the examples shown in FIGS. 6A and 6B, the distribution of tag bits into the preamble and prologue is for illustrative purposes only.

As can be apparent from the example data shown in FIGS. 6A and 6B and with reference to FIG. 1B, a logical model of an address includes a tag portion, a set portion, and a data portion. The tag portion contains the tag bits. When an address arrives at the cache/memory subsystem for lookup against the addresses stored in the cache/memory subsystem, tag bits of the tag portion of the arriving address 110 are used to check against the tag bits of the addresses stored in the preamble tag RAM 120 and, depending on the resulting partial hit(s), against the tag bits of the addresses stored in the prologue tag RAM(s) 130. For an arriving address 110, the set portion 114 includes index bits, which can be used to access appropriate cells in a memory (e.g., as an index for wordline/row selection). The data portion of an address can include various information bits. The information bits in a stored data portion can include error correction code (ECC) bits (e.g., 610, 660), valid bit 690 (e.g., whether the data is valid/meaningful), and security bits, as some examples. In some current technologies, the tag portion of an address includes 13 bits and the set portion of an address includes 13 bits. The number of bits in the data portion is dependent on the size of the cacheline (and can be considered sub-cacheline address bits).

Accordingly, by incorporating additional logic within the RAM used for a Way Halting Cache, it is possible to minimize the timing delays caused by the slow speed of current memories as compared to the increased operational speed of logic circuitry when having to first read out all of the bits in the RAM before performing logic operations to complete a lookup operation in the Way Halting Cache. In addition, by reducing the number of RAMs being accessed, additional power savings can be achieved. Furthermore, through particular selection of the preamble bits as described herein, it is possible to obtain further power savings.

Certain embodiments of the illustrated methods and circuitry include the following.

Clause 1. A system comprising: a preamble tag memory comprising a preamble memory control circuit, a preamble memory array a preamble memory wordline driver, a preamble memory input/output circuitry, a preamble memory hit circuitry, and a preamble memory address bit selection circuitry, wherein the preamble memory hit circuitry is coupled to obtain a first set of bits from a tag portion of an address for a lookup in accordance with the preamble memory address bit selection circuitry; and a prologue tag memory comprising a prologue memory control circuit, a prologue memory array, a prologue memory wordline driver, a prologue memory input/output circuitry, a prologue memory hit circuitry, a valid bit check logic, and a prologue memory address bit selection circuitry, wherein the prologue memory hit circuitry is coupled to obtain a second set of bits from the tag portion of the address for the lookup in accordance with the prologue memory address bit selection circuitry and the valid bit check logic is coupled to receive a valid bit of a stored address.

Clause 2. The system of clause 1, wherein the preamble memory address bit selection circuitry comprises registers structured to store bits of the address, wherein particular registers structured to store bits of the address corresponding to the first set of bits from the tag portion are coupled to the preamble memory hit circuitry.

Clause 3. The system of clause 1, wherein the preamble memory address bit selection circuitry comprises registers structured to store bits of the address and XOR hash circuitry coupled to at least a plurality of the registers, wherein output of the XOR hash circuitry is coupled to the preamble memory hit circuitry, the XOR hash circuitry outputting the first set of bits from the tag portion.

Clause 4. The system of any of clauses 1-3, wherein the prologue memory address bit selection circuitry comprises registers structured to store bits of the address, wherein particular registers structured to store bits of the address corresponding to the second set of bits from the tag portion are coupled to the prologue memory hit circuitry.

Clause 5. The system of any of clauses 1, 2, or 4, wherein the first set of bits from the tag portion includes a portion of the least significant bits of the tag portion.

Clause 6. The system of any preceding clause, wherein the first set of bits from the tag portion contains between 3-7 bits.

Clause 7. The system of any preceding clause, wherein the first set of bits from the tag portion comprises a hash of the tag portion of the address.

Clause 8. The system of any of clauses 1, 2, 4, 5, or 6, wherein the first set of bits from the tag portion comprises non-contiguous bits of the tag portion.

Clause 9. The system of any of clauses 1, 2, 4, 5, or 6, wherein the first set of bits from the tag portion comprises a combination of contiguous bits and non-contiguous bits of the tag portion.

Clause 10. The system of any of clauses 1, 2, 4, 5, or 6, wherein the first set of bits from the tag portion comprises contiguous bits of the tag portion.

Clause 11. The system of any preceding clause, wherein the preamble tag memory stores preamble bits of tags of a plurality of ways and one or more state bits.

Clause 12. A method of performing an address lookup process in a way halting cache, the method comprising: receiving a tag portion and index bits of an address for a lookup; obtaining a first set of bits from the tag portion for a preamble, wherein a second set of bits from the tag portion form a prologue; performing a first matching operation using the preamble to identify a hit in a row of a memory of the way halting cache, the row being selected by the index bits; and for any identified hit from the first matching operation, performing a second matching operation using the prologue and the index bits to finalize the hit and checking a valid bit when performing the second matching operation.

Clause 13. The method of clause 12, wherein obtaining the first set of bits from the tag portion comprises performing a hash operation on the tag portion of the address for lookup.

Clause 14. The method of clause 12 or 13, wherein obtaining the second set of bits from the tag portion comprises selecting the second set of bits from the tag portion of the address, wherein the number of bits of the preamble and the number of bits of the prologue totals to the number of bits of the tag portion of the address.

Clause 15. The method of any of clauses 12-14, wherein the preamble contains between 3-7 bits.

Clause 16. The method of any of clauses 12, 14, or 15, wherein the preamble comprises non-contiguous bits of the tag portion.

Clause 17. The method of any of clauses 12, 14, or 15, wherein the preamble comprises a combination of contiguous and non-contiguous bits of the tag portion.

Clause 18. The method of any of clauses 12-17, wherein the method is performed in a system comprising: a preamble tag memory that performs the first matching operation, the preamble tag memory comprising a preamble memory control circuit, a preamble memory array, a preamble memory wordline driver, a preamble memory input/output circuitry, a preamble memory hit circuitry, and a preamble memory address bit selection circuitry, wherein the preamble memory hit circuitry is coupled to obtain the first set of bits from the tag portion in accordance with the preamble memory address bit selection circuitry; and a prologue tag memory that performs the second matching operation and checks the valid bit, the prologue tag memory comprising a prologue memory control circuit, a prologue memory array, a prologue memory wordline driver, a prologue memory input/output circuitry, a prologue memory hit circuitry, a valid bit check logic, and a prologue memory address bit selection circuitry, wherein the prologue memory hit circuitry is coupled to obtain the second set of bits from the tag portion of the address for the lookup in accordance with the prologue memory address bit selection circuitry and the valid bit check logic is coupled to receive a valid bit of a stored address.

Clause 19. The method of any of clauses 12-17, wherein the method is performed in the system of claim 1, the preamble tag memory block performs the first matching operation; and the prologue tag memory block performs the second matching operation and checks the valid bit.

Clause 20. A memory for performing an address lookup process, comprising: a control circuit, a memory array; a wordline driver, an input/output circuitry, a hit circuitry, an error correction code (ECC) logic that outputs a partial ECC result, a valid bit check logic, wherein the valid bit check logic is coupled to receive a valid bit of a stored address, and an address bit selection circuitry, wherein the hit circuitry is coupled to obtain a set of bits from an address for lookup in accordance with the address bit selection circuitry.

Clause 21. The memory of clause 20, wherein the memory array stores fewer than all tag bits of each address stored therein, wherein the set of bits of the address for lookup selected by the address bit selection circuitry corresponds to tag bit positions of the fewer than all tag bits of each stored address.

Clause 22. The memory of clause 19 or 20, wherein the memory is used as a prologue tag memory block for a method of any of clauses 12-18.

Although the subject matter has been described in language specific to structural features and/or acts, it is to be understood that the subject matter defined in the appended claims is not necessarily limited to the specific features or acts described above. Rather, the specific features and acts described above are disclosed as examples, implementing the claims and other equivalent features and acts; they are intended to be within the scope of the claims.

What is claimed is:

1. A system comprising:
a preamble tag memory comprising a preamble memory control circuit, a preamble memory array a preamble memory wordline driver, a preamble memory input/output circuitry, a preamble memory hit circuitry, and a preamble memory address bit selection circuitry, wherein the preamble memory hit circuitry is coupled to obtain a first set of bits from a tag portion of an address for a lookup in accordance with the preamble memory address bit selection circuitry; and
a prologue tag memory comprising a prologue memory control circuit, a prologue memory array, a prologue memory wordline driver, a prologue memory input/output circuitry, a prologue memory hit circuitry, a valid bit check logic, and a prologue memory address bit selection circuitry, wherein the prologue memory hit circuitry is coupled to obtain a second set of bits from the tag portion of the address for the lookup in accordance with the prologue memory address bit selection circuitry and the valid bit check logic is coupled to receive a valid bit of a stored address, wherein the valid bit for the stored address is stored in the prologue tag memory and checked only during access of the prologue tag memory.

2. The system of claim 1, wherein the preamble memory address bit selection circuitry comprises registers structured to store bits of the address, wherein particular registers structured to store bits of the address corresponding to the first set of bits from the tag portion are coupled to preamble memory hit circuitry.

3. The system of claim 1, wherein the preamble memory address bit selection circuitry comprises:
registers structured to store bits of the tag portion of the address; and
XOR hash circuitry coupled to at least a plurality of the registers, wherein output of the XOR hash circuitry is coupled to the preamble memory hit circuitry, the XOR hash circuitry outputting the first set of bits from the tag portion.

4. The system of claim 1, wherein the prologue memory address bit selection circuitry comprises registers structured to store bits of the address, wherein particular registers structured to store bits of the address corresponding to the second set of bits from the tag portion are coupled to prologue memory hit circuitry.

5. The system of claim 1, wherein the first set of bits from the tag portion includes a portion of the least significant bits of the tag portion.

6. The system of claim 1, wherein the first set of bits from the tag portion contains between 3-7 bits.

7. The system of claim 1, wherein the first set of bits from the tag portion comprises a hash of the tag portion of the address.

8. The system of claim 1, wherein the first set of bits from the tag portion comprises non-contiguous bits of the tag portion.

9. The system of claim 1, wherein the first set of bits from the tag portion comprises a combination of contiguous bits and non-contiguous bits of the tag portion.

10. The system of claim 1, wherein the first set of bits from the tag portion comprises contiguous bits of the tag portion.

11. The system of claim 1, wherein the preamble tag memory stores preamble bits of tags of a plurality of ways and one or more state bits.

12. A method of performing an address lookup process in a way halting cache, the method comprising:
receiving a tag portion and index bits of an address for a lookup;
obtaining a first set of bits from the tag portion for a preamble, wherein a second set of bits from the tag portion form a prologue;
performing a first matching operation using the preamble to identify a hit in a row of a memory of the way halting cache, the row being selected by the index bits; and
for any identified hit from the first matching operation, performing a second matching operation using the prologue and the index bits to finalize the hit and checking a valid bit when performing the second matching operation, wherein the valid bit is only checked when finalizing the hit.

13. The method of claim 12, wherein obtaining the first set of bits from the tag portion comprises performing a hash operation on the tag portion of the address for lookup.

14. The method of claim 13, wherein obtaining the second set of bits from the tag portion comprises selecting the second set of bits from the tag portion of the address, wherein the number of bits of the preamble and the number of bits of the prologue totals to the number of bits of the tag portion of the address.

15. The method of claim 12, wherein the preamble contains between 3-7 bits.

16. The method of claim 12, wherein the preamble comprises non-contiguous bits of the tag portion.

17. The method of claim 12, wherein the preamble comprises a combination of contiguous and non-contiguous bits of the tag portion.

18. The method of claim 12, wherein the method is performed in a system comprising:

a preamble tag memory that performs the first matching operation, the preamble tag memory comprising a preamble memory control circuit, a preamble memory array, a preamble memory wordline driver, a preamble memory input/output circuitry, a preamble memory hit circuitry, and a preamble memory address bit selection circuitry, wherein the preamble memory hit circuitry is coupled to obtain the first set of bits from the tag portion in accordance with the preamble memory address bit selection circuitry; and a prologue tag memory that performs the second matching operation and checks the valid bit, the prologue tag memory comprising a prologue memory control circuit, a prologue memory array, a prologue memory wordline driver, a prologue memory input/output circuitry, a prologue memory hit circuitry, a valid bit check logic, and a prologue memory address bit selection circuitry, wherein the prologue memory hit circuitry is coupled to obtain the second set of bits from the tag portion of the address for the lookup in accordance with the prologue memory address bit selection circuitry and the valid bit check logic is coupled to receive a valid bit of a stored address.

* * * * *